(12) United States Patent
Hwu et al.

(10) Patent No.: US 7,898,617 B2
(45) Date of Patent: Mar. 1, 2011

(54) MULTI-SECTION VISUAL DISPLAY HAVING OVERLAPPING STRUCTURE

(75) Inventors: Keh-Long Hwu, Hsin-Chu (TW);
Kuo-Feng Kao, Hsin-Chu (TW);
Seok-Lyul Lee, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 268 days.

(21) Appl. No.: 12/356,115

(22) Filed: Jan. 20, 2009

(65) Prior Publication Data
US 2010/0079696 A1 Apr. 1, 2010

(30) Foreign Application Priority Data
Sep. 30, 2008 (TW) .............................. 97137582 A

(51) Int. Cl.
*G02F 1/133* (2006.01)

(52) U.S. Cl. ................. 349/73; 349/57; 345/1.3; 345/32

(58) Field of Classification Search .................... 349/57, 349/73
See application file for complete search history.

(56) References Cited

U.S. PATENT DOCUMENTS

| 5,675,687 | A | 10/1997 | Wood | |
|---|---|---|---|---|
| 6,486,890 | B1* | 11/2002 | Harada et al. | 345/660 |
| 2006/0145942 | A1* | 7/2006 | Maatta | 345/1.3 |
| 2008/0224949 | A1* | 9/2008 | Lee et al. | 345/1.3 |

FOREIGN PATENT DOCUMENTS
TW M337752 8/2008

OTHER PUBLICATIONS

English language translation of abstract of M337752.
* cited by examiner

*Primary Examiner* — Richard H Kim
(74) *Attorney, Agent, or Firm* — Thomas, Kayden, Horstemeyer & Risley, LLP

(57) ABSTRACT

A multi-section visual display having an overlapping structure is disclosed, and includes a first magnifying lens, a second magnifying lens, a first display apparatus having a first display panel and a second display apparatus having a second display panel, wherein the second display apparatus is disposed between the first magnifying lens and the first display apparatus, and the second magnifying lens is aligned with the first magnifying lens in an edge-to-edge manner. While at an operation state, a first border area of the first display panel is partially overlapped with a second border area of the second display panel, thereby reducing the non-display area needing shielding by using a virtual image display from the first display panel/magnifying lens to shield a portion of the second border area, thus reducing the space required between the magnifying lenses and the first display panel.

16 Claims, 10 Drawing Sheets

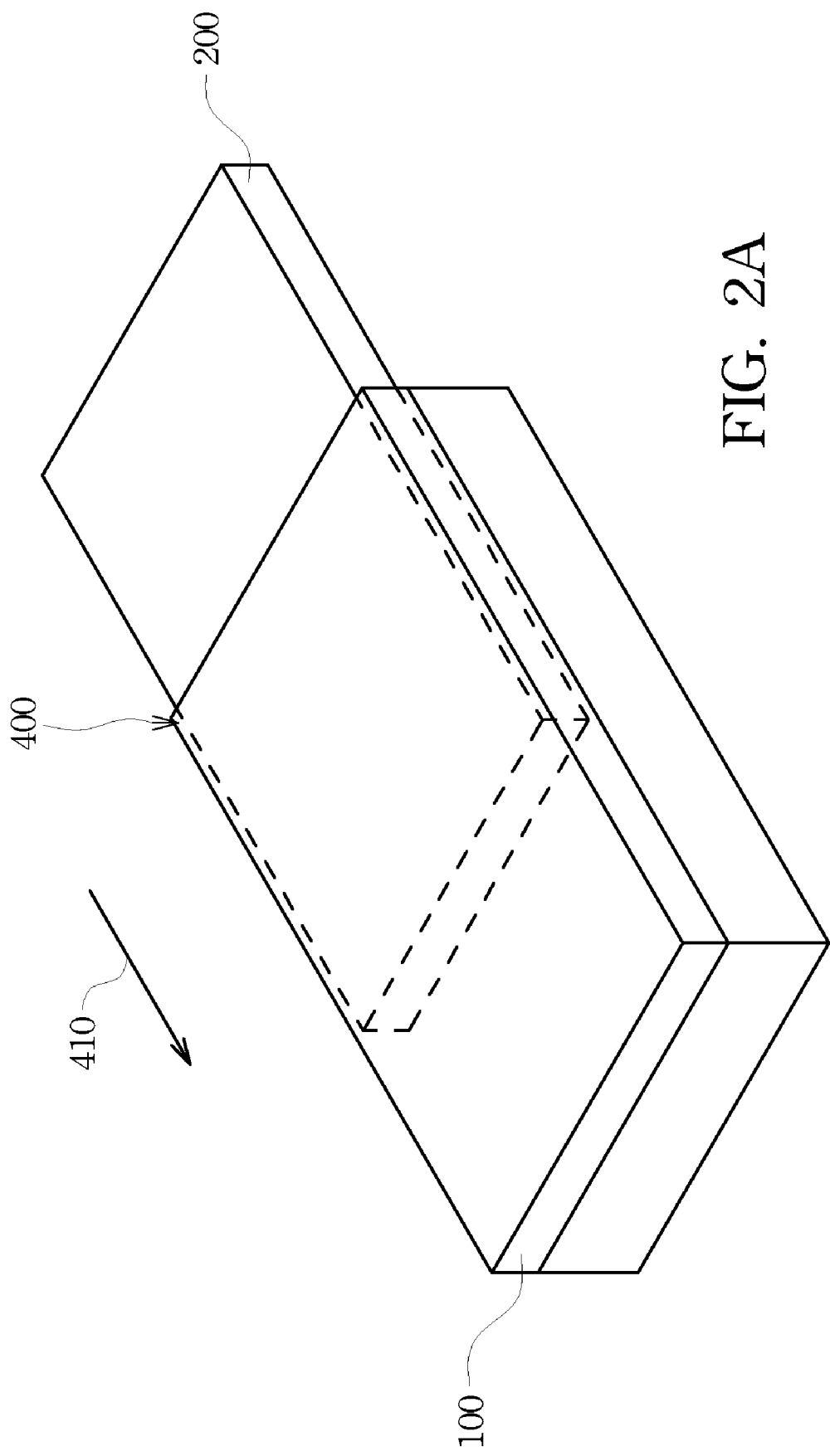

MULTI-SECTION VISUAL DISPLAY HAVING OVERLAPPING STRUCTURE

RELATED APPLICATIONS

This application claims priority to Taiwan Application Serial Number 97137582, filed Sep. 30, 2008, which is herein incorporated by reference.

BACKGROUND

1. Field of Invention

The present invention relates to a multi-section visual display. More particularly, the present invention relates to a multi-section visual display having an overlapping structure.

2. Description of Related Art

Current designs of various electronic information apparatuses are developed towards the trend of lightness and compactness for convenient portability. For example, mobile phones and personal digital assistants are designed towards the direction of lightness, thinness, shortness and smallness. For preventing the screen size of a portable mobile apparatus from affecting the visual clearness or causing eye tiredness, and further meeting the multi-media requirements of future portable mobile apparatuses, a foldable multi-section liquid crystal display (LCD) is presented to the market accordingly. However, since the frame border area located at four edges of a LCD cannot display any image, there is an invalid display area (i.e. a border area with no light emitted and is called no-light border area hereinafter) existing in an intersection area between two screens of a multi-section LCD, thus resulting a discontinuous section appearing in an image crossing the two screens.

For alleviating the influence of the aforementioned border area with no light emitted so as to generate a seamless visual effect on the intersection of the two screens, a convention skill is employed to mount a magnifying lens above the respective display apparatuses for directly performing virtual image magnification so as to shield the frame border area located at the intersection of the two screens. Another conventional skill performs image deviation by using light pipes; or changes light direction by using the material containing the media with different refractive indices.

However, as to commercial liquid crystal displays, their border areas are all more than 1 mm in width, and in the design of a conventional edge-to-edge foldable multi-section display, its total border area is the summation of each screen's border area, and thus the conventional edge-to-edge foldable multi-section display needs to shield quite a large invalid display area. When the invalid display area needing to be shielded is larger, the spacing between the magnifying lens and the display panel also has to be increased, so that the magnifying lens may shield the entire invalid display area via image magnification, thus causing additional space waste and increasing the apparatus' thickness, which conflicts with the feature of lightness and compactness for convenient portability emphasized by the current portable mobile apparatuses. Such additional space is seriously disadvantageous to applying the conventional multi-section display on portable mobile apparatuses.

SUMMARY

Hence, an aspect of the present invention is to provide a multi-section visual display having an overlapping structure for reducing the no-light border area between two adjacent display panels while being at an operation state, thereby greatly reducing the spacing required between lenses and the display panels.

The other aspect of the present invention is to provide a multi-section visual display having an overlapping structure for achieving optimal space utilization by collaborating a folding or sliding mechanism.

In accordance with a preferred embodiment, the multi-section visual display having the overlapping structure comprises a first magnifying lens, a second magnifying lens, a first display apparatus and a second display apparatus, wherein the second display apparatus is disposed between the first magnifying lens and the first display apparatus, and the second magnifying lens is aligned with the first magnifying lens in an edge-to-edge manner. The first display apparatus comprises a first display panel disposed below the first magnifying lens and spaced from the first magnifying lens at a first spacing, and the first display panel has a first border area. The second display apparatus comprises a second display panel spaced from the second magnifying lens at a second spacing, and the second display panel has a second border area. The first display apparatus and the second display apparatus are arranged in a panel-moving mechanism, wherein the panel-moving mechanism has an operation state and a storage state. While the panel-moving mechanism is at the operation state, a portion of the second border area of the second display panel is overlapped with a portion of the first border area of the first display panel, thus forming an overlap portion, and the first magnifying lens is corresponding to the overlap portion and the remaining portion of the first display panel, and the second magnifying lens is corresponding to the remaining portion of the second display panel.

With the application of the aforementioned multi-section visual display having an overlapping structure, the spacing required between the lenses and the display panels can be greatly reduced; and optimal space utilization can be achieved by collaborating a folding or sliding mechanism.

It is to be understood that both the foregoing general description and the following detailed description are examples, and are intended to provide further explanation of the invention as claimed.

BRIEF DESCRIPTION OF THE DRAWINGS

These and other features, aspects, and advantages of the present invention will become better understood with regard to the following description, appended claims, and accompanying drawings where:

FIG. 2A and FIG. 2B are schematic diagrams showing a multi-section visual display using a sliding mechanism according to another preferred embodiment of the present invention, wherein the multi-section visual display enters an operation state from a storage state;

DESCRIPTION OF THE PREFERRED EMBODIMENTS

Figure 1A:
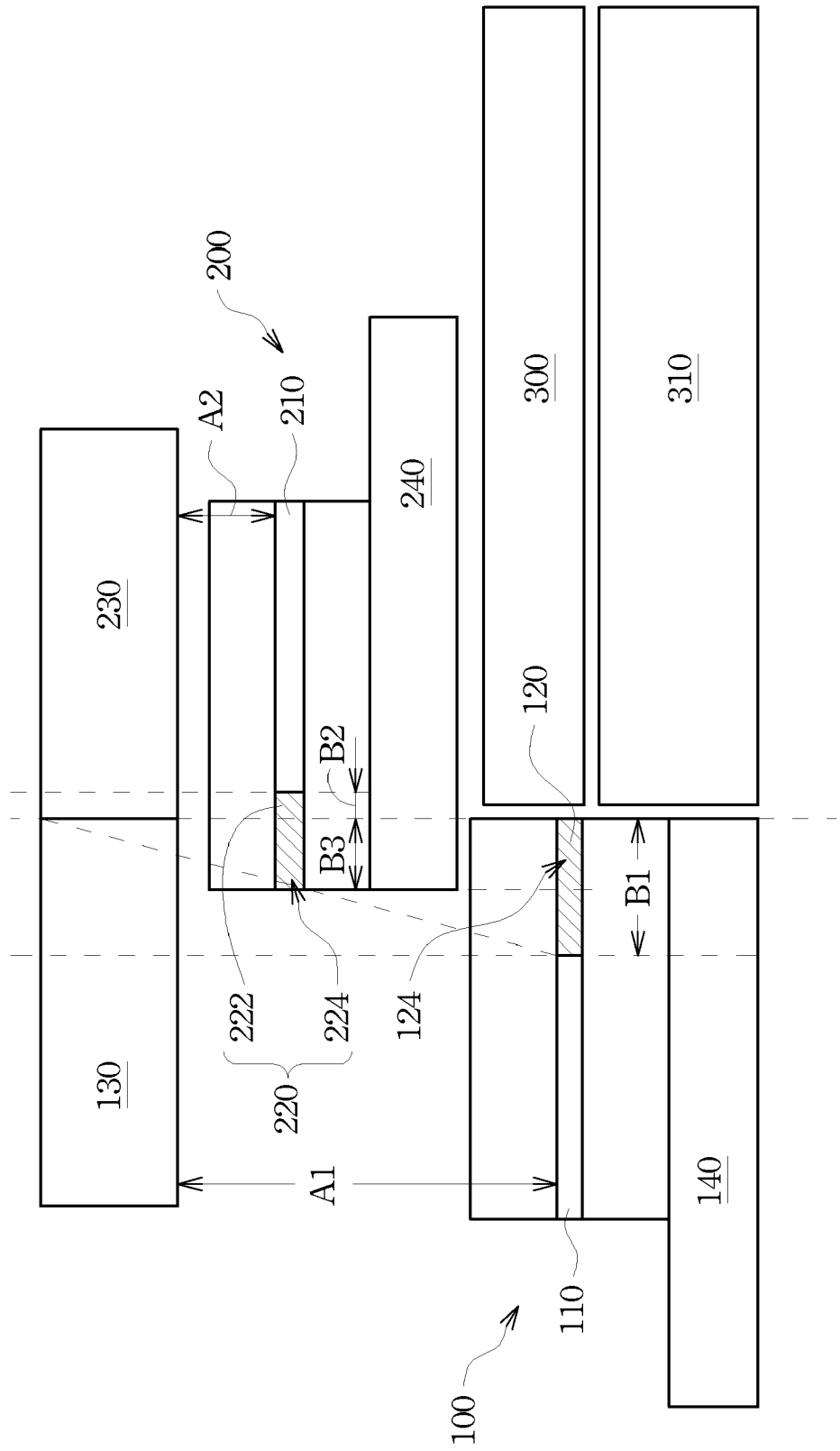
FIG. 1A is a schematic diagram showing a multi-section visual display having an overlapping structure according to a preferred embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1A, FIG. 1A is a schematic diagram showing a multi-section visual display having an overlapping structure according to a preferred embodiment of the present invention. The multi-section visual display of this embodiment comprises a first magnifying lens 130, a second magnifying lens 230, a first display apparatus 100, a second display apparatus 200, a circuit board 300 and a power source 310 (such as a battery), wherein the second display apparatus 200 is disposed between the first magnifying lens 130 and the first display apparatus 100, and the second magnifying lens 230 is aligned with the first magnifying lens 130 in an edge-to-edge manner. The first magnifying lens 130 and the second magnifying lens 230 can be such as Fresnel lenses, which has the advantages of light weight and thin thickness. The first display apparatus 100 comprises a first display panel 110 and a first backlight module 140, wherein the first display panel 110 is disposed below the first magnifying lens 130, and has a first border area 120, and is spaced from the first magnifying lens 130 at a first spacing A1. The second display apparatus 200 comprises a second display panel 210 and a second backlight module 240, wherein the second display panel 210 is spaced from the second magnifying lens 230 at a second spacing A2, and has a second border area 220. The second border area 220 can be divided into an overlap portion 224 and a non-overlap portion 222. The first display apparatus 100 and the second display apparatus 200 are arranged in a panel-moving mechanism (not shown), wherein the panel-moving mechanism has an operation state and a storage state for enabling the first display apparatus 100 and the second display apparatus 200 to be at the operation state or storage state. While the multi-section visual display of this embodiment is moved to be at the operation state via the panel-moving mechanism, a portion 224 of the second border area 220 of the second display panel 210 is overlapped with a portion 124 of the first border area 120 of the first display panel 110, thus forming an overlap portion 224(124) with a width B3, and the first magnifying lens 130 is corresponding to the entire surface of the first display panel 110 (i.e. the overlap portion and the remaining portion of the first display panel), and the second magnifying lens 230 is corresponding to the remaining portion of the second display panel 210 (i.e. the portion except the overlap portion 224).

This embodiment is mainly to overlap portions of the border areas (invalid display areas) of two adjacent display panels, thereby using the virtual display from the first display panel 110/the first magnifying lens 130 located at the lower part of the multi-section visual display to shield the border area (invalid display area) of the second display panel 210/the second magnifying lens 230 located at the upper part thereof, so that the total invalid display area of the first display panel 110/the second display panel 210 required to be shielded can be reduced to the width B1 of the first border area 120 plus the width B2 of the non-overlap portion 222 of the second border area 220, i.e. B1+B2. If the first display apparatus 100 and the second display apparatus 200 were arranged in the conventional edge-to-edge manner, the total invalid display area required to be shielded would be the summation of the widths of the first border area 120 and the second border area 220, i.e. B1+B3+B2. Since the invalid display area of the magnifying lens/display apparatus of this embodiment is decreased relatively, the respective space required between the magnifying lens and the display apparatuses is also decreased. In other words, the first spacing A1 of this embodiment is smaller than the spacing of the conventional apparatus. Hence, by using the structure of this embodiment, the requirements of lightness, thinness and smallness can be effectively satisfied.

In the above description, two adjacent display apparatuses are used for explaining the present embodiment. However, the present embodiment is also suitable for use in a multi-section display system using more than two display apparatuses of which every two adjacent display apparatuses are partially overlapped, and thus the present embodiment is not limited to the application with only two adjacent display apparatuses. Further, the display apparatuses used in the present embodiment can be such as liquid crystal displays.

Figure 1B:
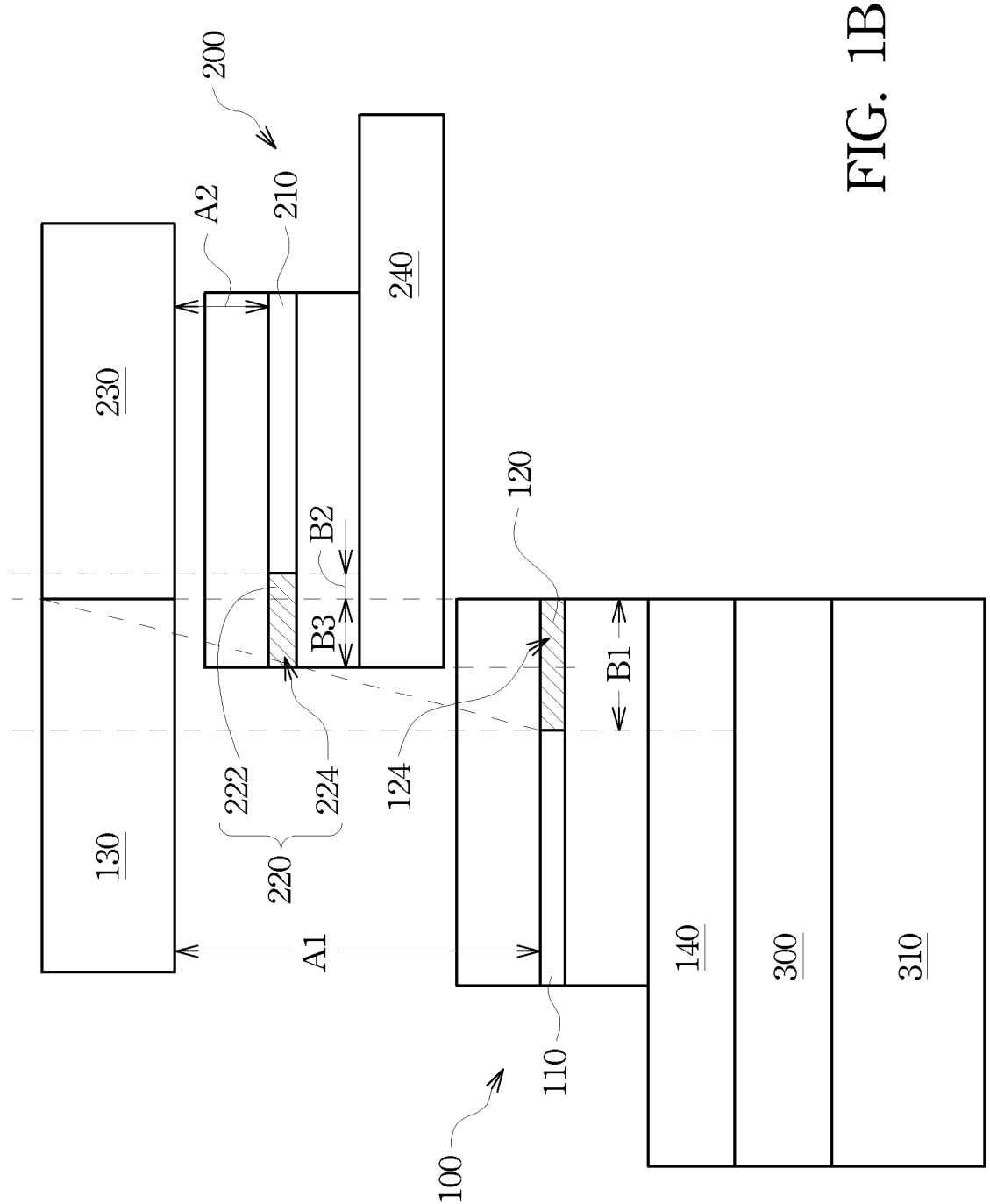
FIG. 1B is a schematic diagram showing a multi-section visual display having an overlapping structure according to another preferred embodiment of the present invention.

In the present embodiment, the first backlight module 140 is disposed below the first display panel 110 for providing light to the first display panel 110; the second backlight module 240 is disposed between the first display panel 110 and the second display panel 210 for providing light to the second display panel 210; and the circuit board 300 and the power source 310 are disposed below the second display apparatus 200. Besides, referring the FIG. 1B, FIG. 1B is a schematic diagram showing a multi-section visual display having an overlapping structure according to another preferred embodiment of the present invention, wherein the circuit board 300 and the power source 310 are disposed below the first display apparatus 100.

The present invention achieves optimal space utilization by collaborating an overlapping structure of multiple display panels with a sliding or folding panel-moving mechanism. The panel-moving mechanism of the present invention is explained hereinafter. The panel-moving mechanism of the present invention can be a folding mechanism or a sliding mechanism. Regardless of the folding mechanism or the sliding mechanism, while being at the operation state, the first border area 120 of the first display panel 110 is partially overlapped with the second border area 220 of the second display panel 210, such as shown in FIG. 1A or FIG. 1B.

Figure 2B:
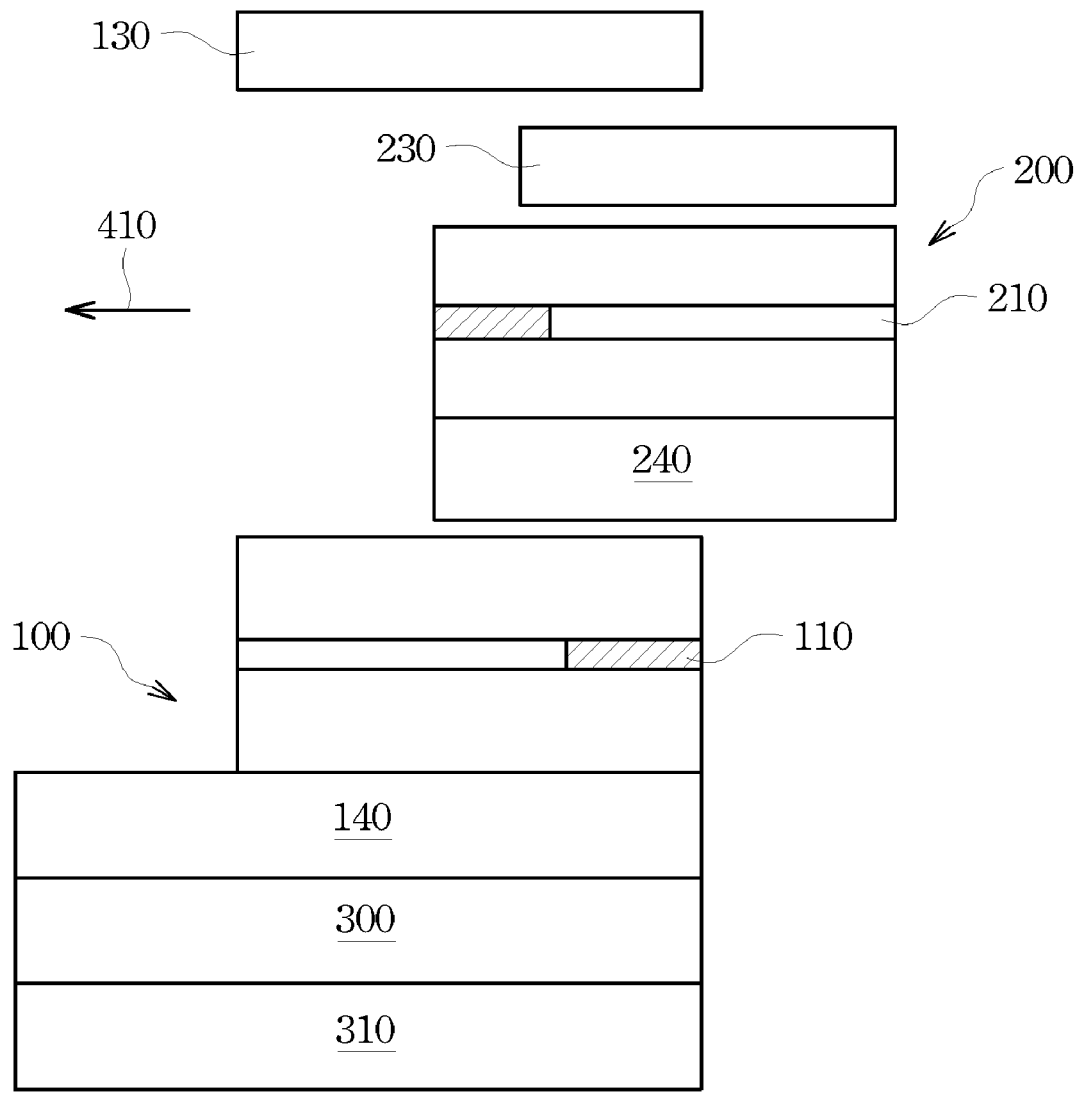
Figure 3A:
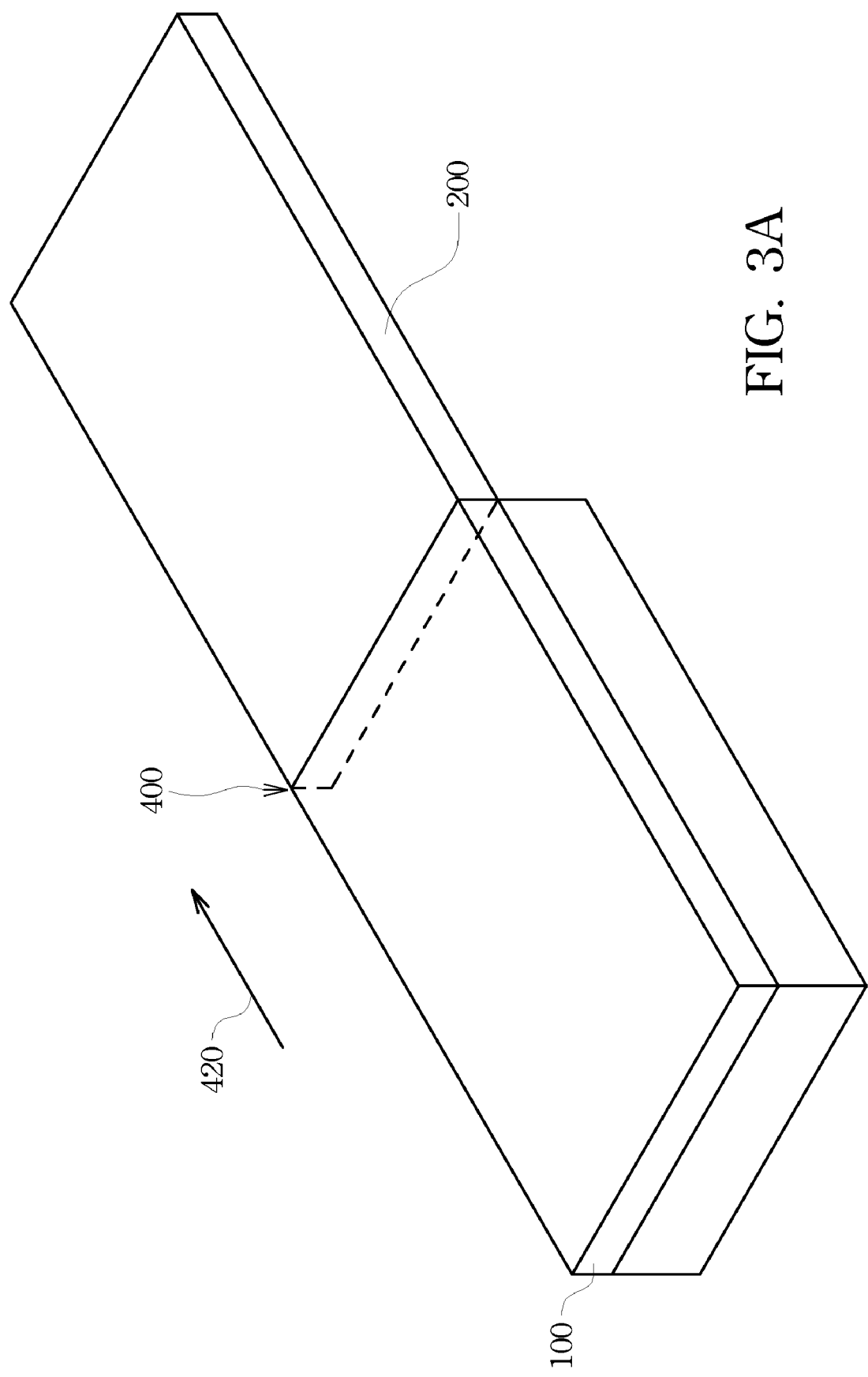
FIG. 3A and FIG. 3B are schematic diagrams showing a multi-section visual display using a sliding mechanism according to another preferred embodiment of the present invention, wherein the multi-section visual display enters a storage state from an operation state.
Figure 3B:
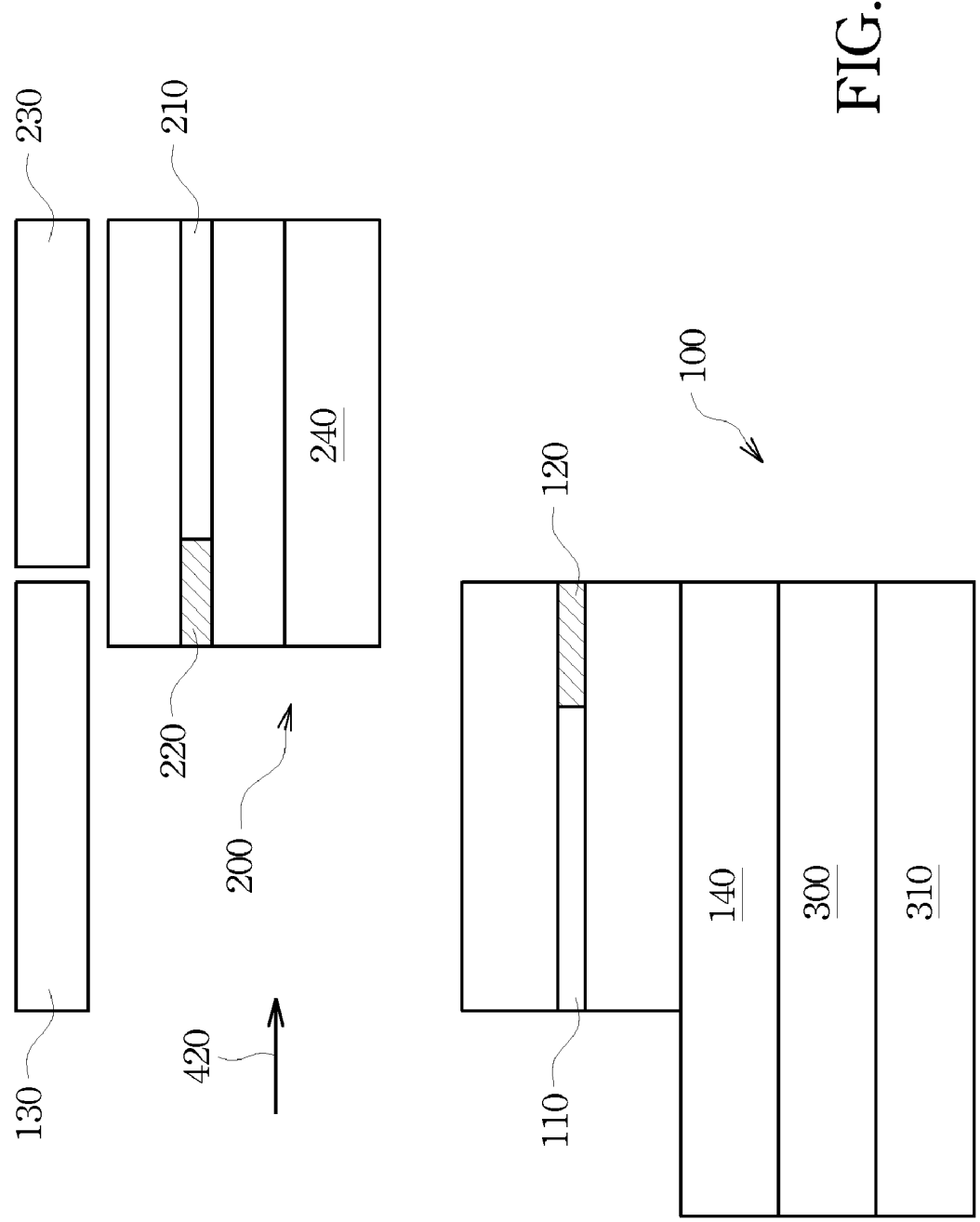

Referring to FIG. 2A and FIG. 2B, FIG. 2A and FIG. 2B are schematic diagrams showing a multi-section visual display using a sliding mechanism 400 according to another preferred embodiment of the present invention, wherein the multi-section visual display enters the operation state from the storage state. When the sliding mechanism (panel-moving mechanism) 400 enters the operation state from the storage state, the second display apparatus 200 and the second magnifying lens 230 are moved along a direction 410 and received between the first display apparatus 100 and the first magnifying lens 130. Referring to FIG. 3A and FIG. 3B, FIG. 3A and FIG. 3B are schematic diagrams showing the multi-section visual display using the sliding mechanism according to another preferred embodiment of the present invention, wherein the multi-section visual display enters the storage state from the operation state. When the sliding mechanism 400 enters the storage state from the operation state, the second display apparatus 200 and the second magnifying lens 230 are moved along a direction 420 and folded as the related positions shown in FIG. 1A.

Figure 4A:
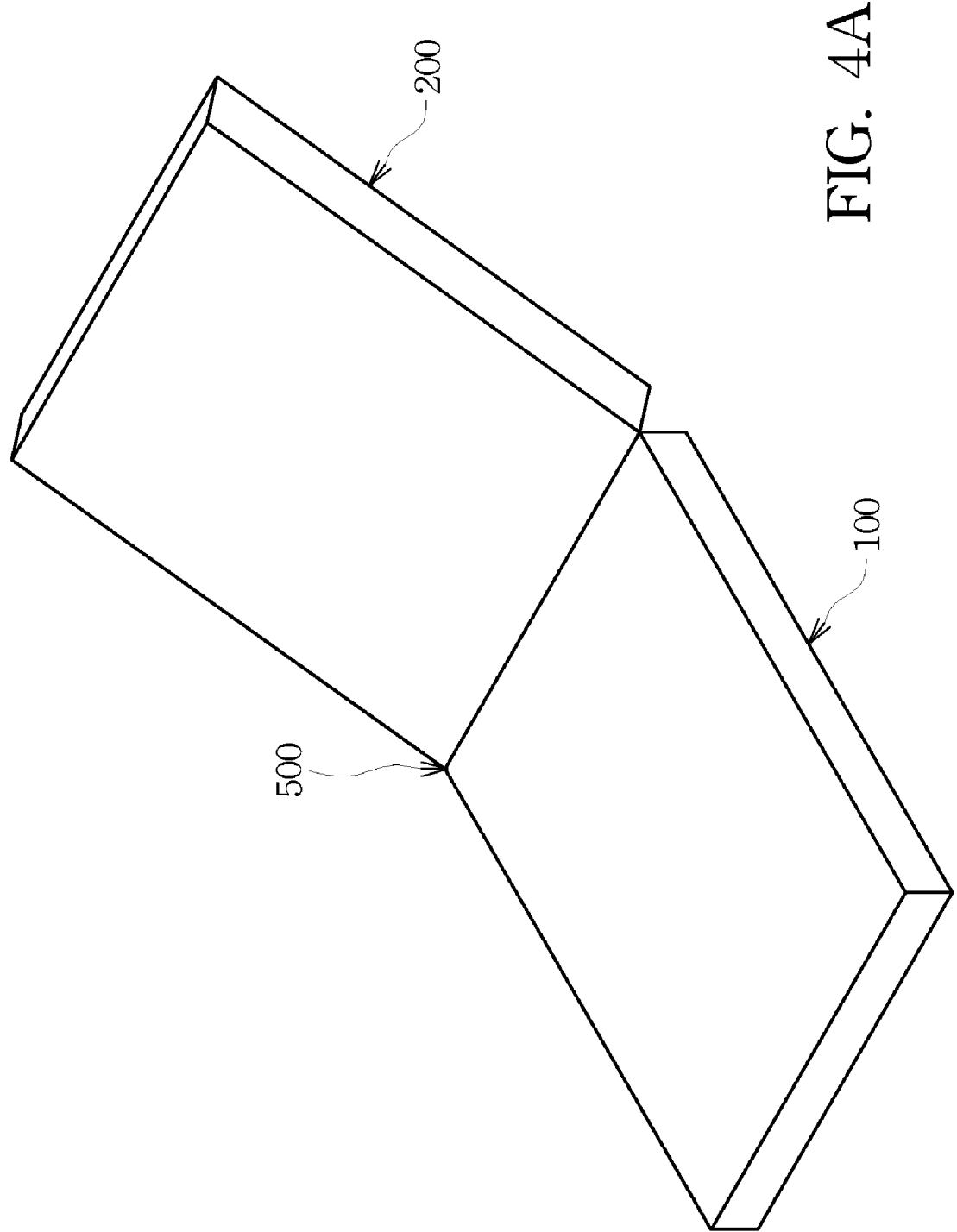
FIG. 4A and FIG. 4B are schematic diagrams showing a multi-section visual display using a folding mechanism according to another preferred embodiment of the present invention.
Figure 4B:
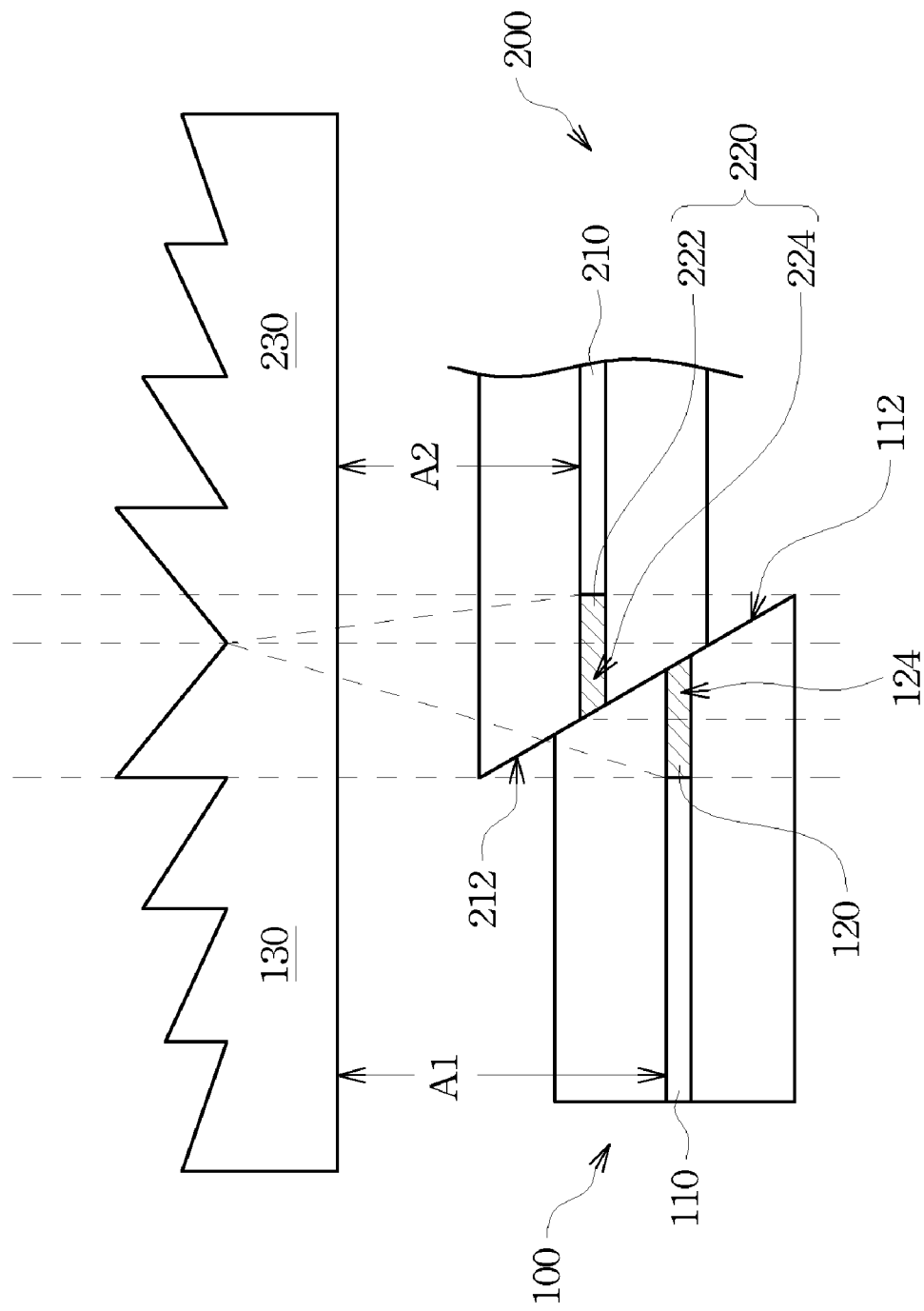

Referring to FIG. 4A and FIG. 4B, FIG. 4A and FIG. 4B are schematic diagrams showing a multi-section visual display using a folding mechanism 500 according to another preferred embodiment of the present invention. When the folding mechanism (panel-moving mechanism) 500 is at the storage state, the second display apparatus 200 and the second magnifying lens 230 are disposed above the first display apparatus 100 and the first magnifying lens 130. Besides, such as shown in FIG. 4B, the first display apparatus 100 has a first slant side 112, and the second display apparatus 200 has a second slant side 212. When the folding mechanism 500 is at the operation state, the first slant side 112 is laterally merged with the second slant side 212. This design of merging two slant sides is convenient for the design of the folding mechanism 500, but is also suitable for use in the sliding mechanism. The detail design regarding the folding or sliding mechanism is well known to those who are skilled in the art, and thus is repeated herein.

The design principles of the present invention are described as follows.

Design Principle 1

Figure 5A:
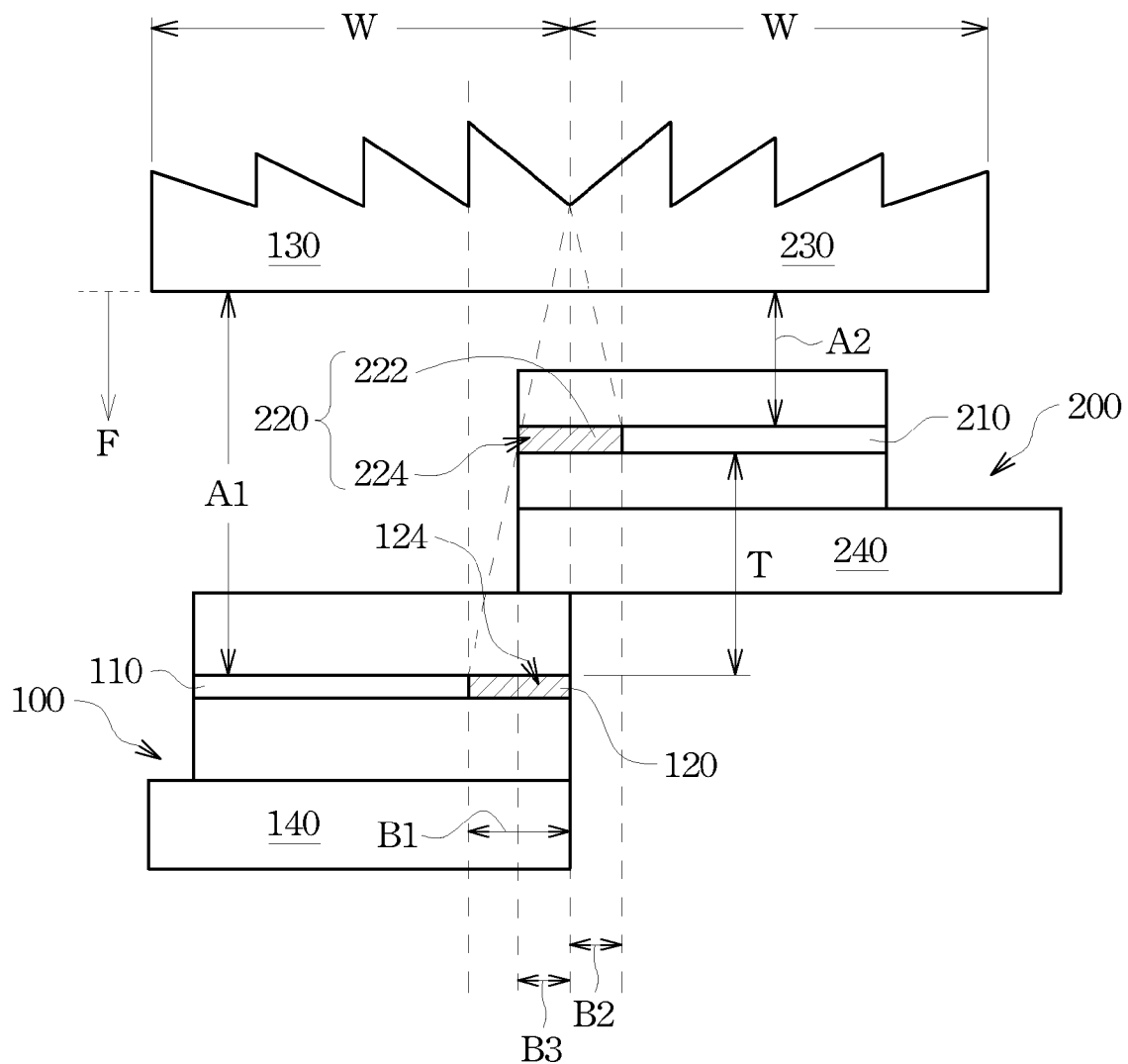
FIG. 5A and FIG. 5B are schematic diagrams for explaining the design principles of the present invention.

Referring to FIG. 5A, FIG. 5A is a schematic diagram for explaining a design principle of the present invention, wherein the first magnifying lens 110 and the second magnifying lens 120 both have a same focal length F and a same half width W of lens, and the first spacing A1, the second spacing A2, a width B1 of the first border area 110, a width B2 of the non-overlap portion 222, the focal length F and the half width W of lens satisfies the following relationship:

$$\frac{W}{F} = \frac{B1}{A1} = \frac{B2}{A2} \quad (1)$$

wherein B2 represents the width of the second border area 220 minus the width B3 of the overlap portion 224, i.e. the width of the non-overlap portion 222.

There are two cases for design principle 1.

Case 1: When an outer boundary of the first border area 120 is aligned with an intersection of the first magnifying lens 130 and the second magnifying lens 230, the first spacing A1, the second spacing A2, the width B1 of the first border area 120, the width B2 of the non-overlap portion 222, the width B3 of the overlap portion 224, the focal length F and the half width W of lens satisfying the following relationship:

$$\frac{W}{F} = \frac{B1}{A1} = \frac{B2}{A2} = \frac{B3}{A2} \quad (2)$$

Case 2: When the outer boundary of the first border area is not aligned with the intersection of the first magnifying lens and the second magnifying lens, the first spacing A1, the second spacing A2, the width B2 of the non-overlap portion 222, the focal length F and the half width (W) of lens satisfying the following relationship:

$$A1 = \left(\frac{B2}{W}\right) \times F + T \quad (3)$$

wherein T=A1−A2; i.e. the distance between the first display panel 110 and the second display panel 210.

Design Principle 2

Figure 5B:
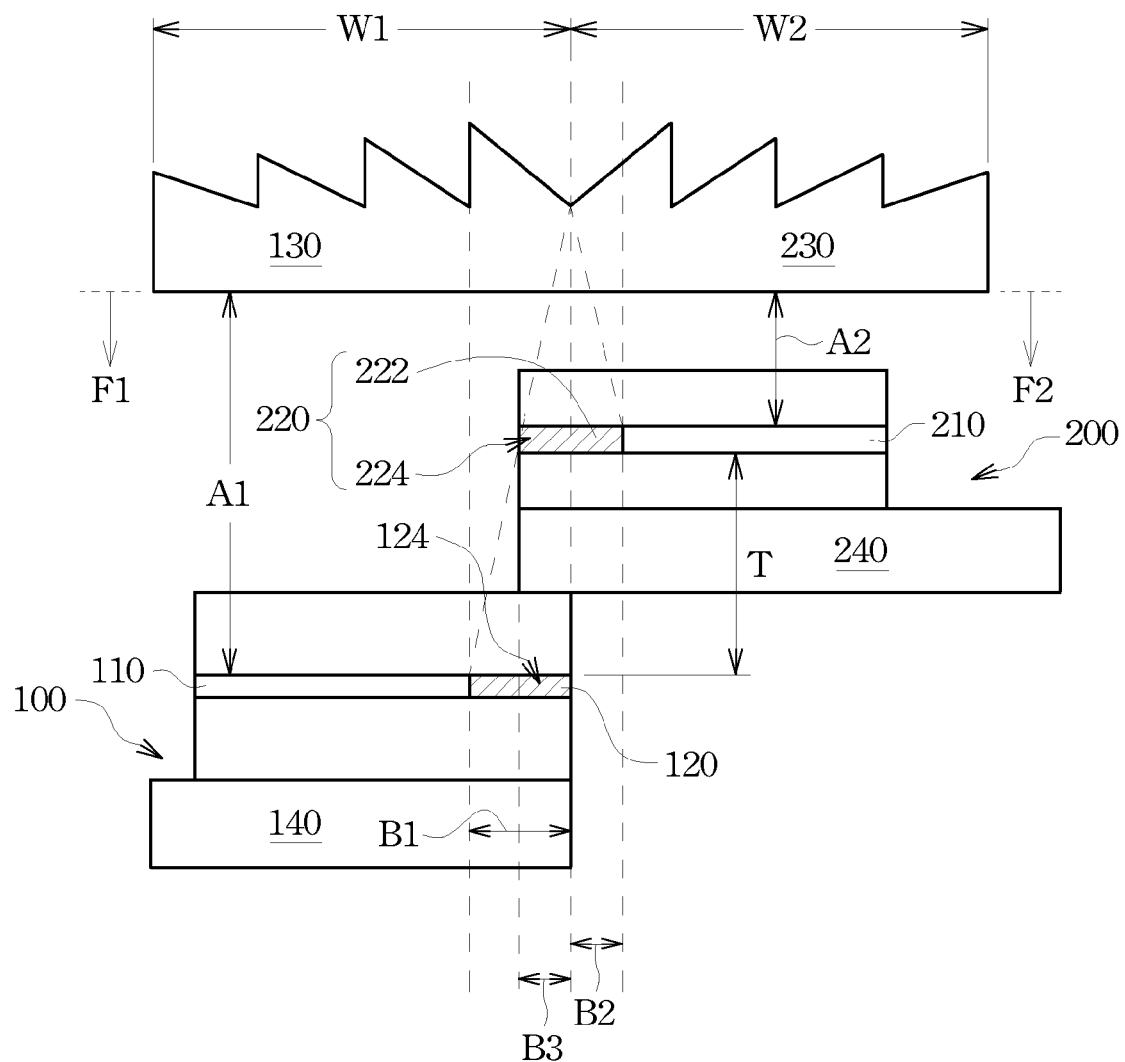

Referring to FIG. 5B, FIG. 5B is a schematic diagram for explaining another design principle of the present invention, wherein the first magnifying lens has a first focal length F1 and a first half width W1 of lens, and the second magnifying lens has a second focal length F2 and a second half width W2 of lens, the first spacing A1, the second spacing A2, the width B1 of the first border area 120, the width B3 of the overlap portion 224, the first focal length F1, the second focal length F2, the first half width W1 of lens and the second half width W2 of lens satisfies the following relationship:

$$\frac{W1}{F1} = \frac{B1}{A1} = \frac{B3}{A2}; \frac{W2}{F2} = \frac{B2}{A2}; B1 = B2 + B3 \quad (4)$$

wherein B2 represents the width of the second border area 220 minus the width B3 of the overlap portion 224.

There are two cases for design principle 2.

Case 1: When the outer boundary of the first border area 120 is aligned with the intersection of the first magnifying lens 110 and the second magnifying lens 210, the first spacing A1, the second spacing A2, the width B1 of the first border area 120, the width B2 of the non-overlap portion 222, the width B3 of the overlap portion 224, the first focal length F1, the second focal length F2, the first half width W1 of lens and the second half width W2 of lens satisfies the following relationship:

$$A1 = \frac{F1}{W1} \times B1; B3 = \frac{W1}{F1} \times (A1 - T); F2 = \frac{W2 \times (A1 - T)}{(B1 - B3)} \quad (5)$$

wherein T=A1−A2; i.e. the distance between the first display panel 110 and the second display panel 210.

Case 2: When the outer boundary of the first border area 120 is not aligned with the intersection of the first magnifying lens 130 and the second magnifying lens 230, the first spacing A1, the second spacing A2, the width B1 of the first border area 120, the width B3 of the overlap portion 224, the width B2 of the non-overlap portion 222, the first focal length F1, the second focal length F2, the first half width W1 of lens and the second half width W2 of lens satisfies the following relationship:

$$A1 = \left(\frac{F1}{W1}\right) \times B3 + T; F2 = \frac{(A1 - T) \times W2}{B1 - B3} \quad (6)$$

wherein T=A1−A2.

It can be known from the preferred embodiments described above, the present invention has the advantages of greatly reducing the spacing required between the lenses and the display panels; and achieving optimal space utilization by collaborating a folding or sliding mechanism.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A multi-section visual display having an overlapping structure, comprising:
    a first magnifying lens;
    a second magnifying lens, wherein the second magnifying lens is aligned with the first magnifying lens in an edge-to-edge manner;
    a first display apparatus, comprising:
        a first display panel disposed below the first magnifying lens and spaced from the first magnifying lens at a first spacing (A1), wherein the first display panel has a first border area; and
    a second display apparatus disposed between the first magnifying lens and the first display apparatus, wherein the second display apparatus comprises:
        a second display panel spaced from the second magnifying lens at a second spacing (A2), wherein the second display panel has a second border area, and the first display apparatus and the second display apparatus are arranged in a panel-moving mechanism, the panel-moving mechanism having an operation state and a storage state;
    wherein, while the panel-moving mechanism is at the operation state, a portion of the second border area of the second display panel is overlapped with a portion of the first border area of the first display panel, thus forming an overlap portion, and the first magnifying lens is corresponding to the overlap portion and the remaining portion of the first display panel, and the second magnifying lens is corresponding to the remaining portion of the second display panel.

2. The multi-section visual display as claimed in claim 1, wherein the first magnifying lens and the second magnifying lens have a same focal length (F) and a same half width (W) of lens, the first spacing (A1), the second spacing (A2), a width (B1) of the first border area, a width of the second border area, a width (B3) of the overlap portion, the focal length (F) and the half width (W) of lens satisfying the following relationship:

$$\frac{W}{F} = \frac{B1}{A1} = \frac{B2}{A2},$$

wherein B2 represents the width of the second border area minus the width (B3) of the overlap portion.

3. The multi-section visual display as claimed in claim 2, wherein when an outer boundary of the first border area is aligned with an intersection of the first magnifying lens and the second magnifying lens, the first spacing (A1), the second spacing (A2), the width (B1) of the first border area, the width of the second border area, the width (B3) of the overlap portion, the focal length (F) and the half width (W) of lens satisfying the following relationship:

$$\frac{W}{F} = \frac{B1}{A1} = \frac{B2}{A2} = \frac{B3}{A2}.$$

4. The multi-section visual display as claimed in claim 2, wherein when an outer boundary of the first border area is not aligned with an intersection of the first magnifying lens and the second magnifying lens, the first spacing (A1), the second spacing (A2), the width (B1) of the first border area, the width of the second border area, the width (B3) of the overlap portion, the focal length (F) and the half width (W) of lens satisfying the following relationship:

$$A1 = \left(\frac{B2}{W}\right) \times F + T,$$

wherein T=A1−A2.

5. The multi-section visual display as claimed in claim 1, wherein the first magnifying lens has a first focal length (F1) and a first half width (W1) of lens, and the second magnifying lens has a second focal length (F2) and a second half width (W2) of lens, the first spacing (A1), the second spacing (A2), a width (B1) of the first border area, a width of the second border area, a width (B3) of the overlap portion, the first focal length (F1), the second focal length (F2), the first half width (W1) of lens and the second half width (W2) of lens satisfying the following relationship:

$$\frac{W1}{F1} = \frac{B1}{A1} = \frac{B3}{A2}; \frac{W2}{F2} = \frac{B2}{A2};$$

B1=B2+B3, wherein B2 represents the width of the second border area minus the width (B3) of the overlap portion.

6. The multi-section visual display as claimed in claim 5, wherein when an outer boundary of the first border area is aligned with an intersection of the first magnifying lens and the second magnifying lens, the first spacing (A1), the second spacing (A2), the width (B1) of the first border area, the width (B3) of the overlap portion, the first focal length (F1), the second focal length (F2), the first half width (W1) of lens and the second half width (W2) of lens satisfying the following relationship:

$$A1 = \frac{F1}{W1} \times B1; B3 = \frac{W1}{F1} \times (A1-T); F2 = \frac{W2 \times (A1-T)}{(B1-B3)},$$

wherein T=A1−A2.

7. The multi-section visual display as claimed in claim 5, wherein when an outer boundary of the first border area is not aligned with an intersection of the first magnifying lens and the second magnifying lens, the first spacing (A1), the second spacing (A2), the width (B1) of the first border area, the width (B3) of the overlap portion, the first focal length (F1), the second focal length (F2), the first half width (W1) of lens and the second half width (W2) of lens satisfying the following relationship:

$$A1 = \left(\frac{F1}{W1}\right) \times B3 + T; F2 = \frac{(A1-T) \times W2}{B1-B3},$$

wherein T=A1−A2.

8. The multi-section visual display as claimed in claim 1, wherein the first magnifying lens and the second magnifying lens are Fresnel lenses.

9. The multi-section visual display as claimed in claim 1, wherein the first display apparatus comprises a first backlight module disposed below the first display panel for providing light to the first display panel; and the second display apparatus comprises a second backlight module disposed between the first display panel and the second display panel for providing light to the second display panel.

10. The multi-section visual display as claimed in claim 1, further comprising:
   a circuit board and a power source disposed below the second display apparatus.

11. The multi-section visual display as claimed in claim 1, further comprising:
   a circuit board and a power source disposed below the first display apparatus.

12. The multi-section visual display as claimed in claim 1, wherein the first display apparatus has a first slant side, and the second display apparatus has a second slant side, and the first slant side is laterally merged with the second slant side when the panel-moving mechanism is at the operation state.

13. The multi-section visual display as claimed in claim 1, wherein the panel-moving mechanism is a folding mechanism.

14. The multi-section visual display as claimed in claim 13, wherein the second display apparatus and the second magnifying lens are disposed above the first display apparatus and the first magnifying lens when the panel-moving mechanism is at the storage state.

15. The multi-section visual display as claimed in claim 1, wherein the panel-moving mechanism is a sliding mechanism.

16. The multi-section visual display as claimed in claim 15, wherein the second display apparatus and the second magnifying lens are received between the first display apparatus and the first magnifying lens when the panel-moving mechanism is at the storage state.

\* \* \* \* \*